(12) United States Patent
Ishihara et al.

(10) Patent No.: US 8,209,614 B2
(45) Date of Patent: Jun. 26, 2012

(54) GRAPHICAL USER INTERFACE, DISPLAY CONTROL DEVICE, DISPLAY METHOD, AND PROGRAM

(75) Inventors: Ayuko Ishihara, Kanagawa (JP); Takuo Ikeda, Tokyo (JP); Hidenori Karasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 12/190,978

(22) Filed: Aug. 13, 2008

(65) Prior Publication Data
US 2009/0049400 A1 Feb. 19, 2009

(30) Foreign Application Priority Data
Aug. 15, 2007 (JP) .................................. 2007-211944

(51) Int. Cl.
*G06F 13/00* (2006.01)
*G06F 15/00* (2006.01)
(52) U.S. Cl. ........................................ 715/736; 715/734
(58) Field of Classification Search .................. 715/731, 715/247, 781, 785, 850, 864, 716, 734–736, 715/764–765, 751–753
See application file for complete search history.

(56) References Cited

U.S. PATENT DOCUMENTS

| | | | | |
|---|---|---|---|---|
| 2004/0095376 A1* | 5/2004 | Graham et al. | | 345/716 |
| 2006/0020904 A1* | 1/2006 | Aaltonen et al. | | 715/850 |
| 2006/0268100 A1* | 11/2006 | Karukka et al. | | 348/14.01 |
| 2008/0126979 A1* | 5/2008 | Abe et al. | | 715/781 |

FOREIGN PATENT DOCUMENTS

| | | |
|---|---|---|
| JP | 2004-46799 | 2/2004 |
| JP | 2005-267279 | 9/2005 |
| JP | 2007-164297 | 6/2007 |

OTHER PUBLICATIONS

U.S. Appl. No. 12/191,640, filed Aug. 14, 2008, Ikeda, et al.

* cited by examiner

*Primary Examiner* — Cao "Kevin" Nguyen
(74) *Attorney, Agent, or Firm* — Oblon, Spivak, McClelland, Maier & Neustadt, L.L.P.

(57) ABSTRACT

There is provided a graphical user interface that displays information on a plurality of different types of content on a single screen. The graphical user interface includes an overview display area and a detail display area. The overview display area displays an overview of the information on the content in chronological order, based on time information for the plurality of the different types of content. The detail display area displays, in greater detail, the information on the content that corresponds to the time information that is selected in the overview display area. Scrolling the information that is displayed in the overview display area causes the information on the content that is displayed in the detail display area to be scrolled.

10 Claims, 5 Drawing Sheets

GRAPHICAL USER INTERFACE, DISPLAY CONTROL DEVICE, DISPLAY METHOD, AND PROGRAM

CROSS REFERENCES TO RELATED APPLICATIONS

The present invention contains subjected matter related to Japanese Patent Application JP 2007-211944 filed in the Japan Patent Office on Aug. 15, 2007, the entire contents of which being incorporated herein by reference.

BACKGROUND OF THE INVENTION

1. Field of the Invention

The present invention relates to a graphical user interface, a display control device, a display method, and a program.

2. Description of the Related Art

In recent years, as information processing technologies have become more advanced, a variety of functions have been incorporated into small devices such as mobile telephones, game devices, and the like. In addition to communication functions and telephony functions, these devices are now equipped with a wide range of functions such as electronic mail functions, photography functions, schedule management functions, and the like. In order to use the various functions, a user of one of these devices launches an application that corresponds to a desired function. For example, a user who uses an e-mail function launches an e-mail application. Then the user creates an e-mail and transmits the created e-mail. In a case where the user, while using one function, decides to use another function, the user launches a separate application that corresponds to the other function. Furthermore, in a case where the user decides to use different content in the same application, the user first returns to a menu screen, then switches to a screen for selecting the desired content. This causes the user to work through an excessive number of steps.

In a case where the user uses an information processing device that is equipped with a large display device, the user can have a plurality of applications running at the same time and can switch between the applications and between the content to use them. This makes it possible to omit steps by the user. However, in a case where the user uses a device that is equipped with only a small display device, the small display causes the user to work through the steps described above, which diminishes the device's convenience for the user.

Reasons that the user might use a plurality of functions concurrently include, for example, a desire to know a temporal or spatial relationship between information in an e-mail that is transmitted or received by an e-mail function and information in a photograph that is taken by a photography function. In other cases, the user might want to know statistical information pertaining to content that was acquired or provided in the past or want to know a relationship between that statistical information and information on other content.

For example, in Japanese Patent Application Publication No. JP-A-2005-135401, a mobile terminal device is disclosed that can display, in chronological order, a list of e-mails the user has transmitted and e-mails the user has received. By displaying the list that contains both the transmitted e-mails and the received e-mails, the device makes it possible for the user to see at a glance the flow of an exchange with a single correspondent.

SUMMARY OF THE INVENTION

The device described above provides an advantage in that it makes it possible to see transmitted and received e-mails at a glance based on information on the correspondent. However, the device does not show to the user a relationship between the e-mail function and another function. Therefore, when the user wants to extract a desired photograph based on e-mail time information, for example, the user searches for the desired photograph by first storing or making a note of the e-mail time information, then compare the e-mail time information to time information that is displayed on a photography application screen. Accordingly, a display method is required that is capable of defining the time information as key information and comparing a plurality of types of data to the key information. A graphical user interface is also required to implement the display method.

Accordingly, the present invention addresses these issues and provides a graphical user interface, a display control device, a display method, and a program that are new and improved and that make it possible to view data in a temporal sequence by defining the time information as the key information, displaying a plurality of types of related data, and providing a display of the data in chronological order in a form that can be scrolled.

In order to address the issues described above, according to an embodiment of the present invention, there is provided a graphical user interface that displays information on a plurality of different types of content on a single screen. The graphical user interface includes an overview display area and a detail display area. The overview display area displays an overview of the information on the content in chronological order, based on time information for the plurality of the different types of content. The detail display area displays, in greater detail, the information on the content that corresponds to the time information that is selected in the overview display area. Scrolling the information that is displayed in the overview display area causes the information on the content that is displayed in the detail display area to be scrollably displayed.

A plurality of the information on the contents may also be displayed as linked in the detail display area, based on key information that is contained in the plurality of the content.

One of all and a part of the content that is related to the time information that corresponds to the information on the content that is specified in the overview display area may also be displayed in the detail display area.

Information on e-mail data and information on image data that are mutually related based on the time information may also be displayed in the detail display area.

In order to address the issues described above, according to another embodiment of the present invention, there is provided a display control device that displays the graphical user interface on a display device. The display control device includes a display control portion and a scroll processing portion. The display control portion displays the overview display area and the detail display area on the display device. The scroll processing portion scrolls the display in the detail display area in accordance with scrolling of the display in the overview display area.

In order to address the issues described above, according to another embodiment of the present invention, there is provided a display method that displays the graphical user interface on a display device. The display method includes a step of displaying the overview display area and the detail display area on the display device. The display method also includes a step of scrolling the display in the detail display area in accordance with scrolling of the display in the overview display area.

In order to address the issues described above, according to another embodiment of the present invention, there is provided a program that causes a computer to perform the functions of the display control device. A storage medium is also provided in which the program is stored.

According to the embodiments of the present invention described above, displaying a plurality of types of related data, with the time information defined as the key, and providing a scrollable display of the data in chronological order makes it possible to view the data in chronological order.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiment

First, an embodiment according to the present invention will be explained in detail. The present embodiment relates to a technology that displays information pertaining to a plurality of types of content on a single screen in chronological order. The present embodiment also relates to a technology that displays two display areas on a display device and scrollably displays the information in the two display areas in a coordinated manner. One display area displays an overview of the information that pertains to the content, and the other display area displays the information that pertains to the content in detail.

Configuration of Display System 1000

Figure 1:
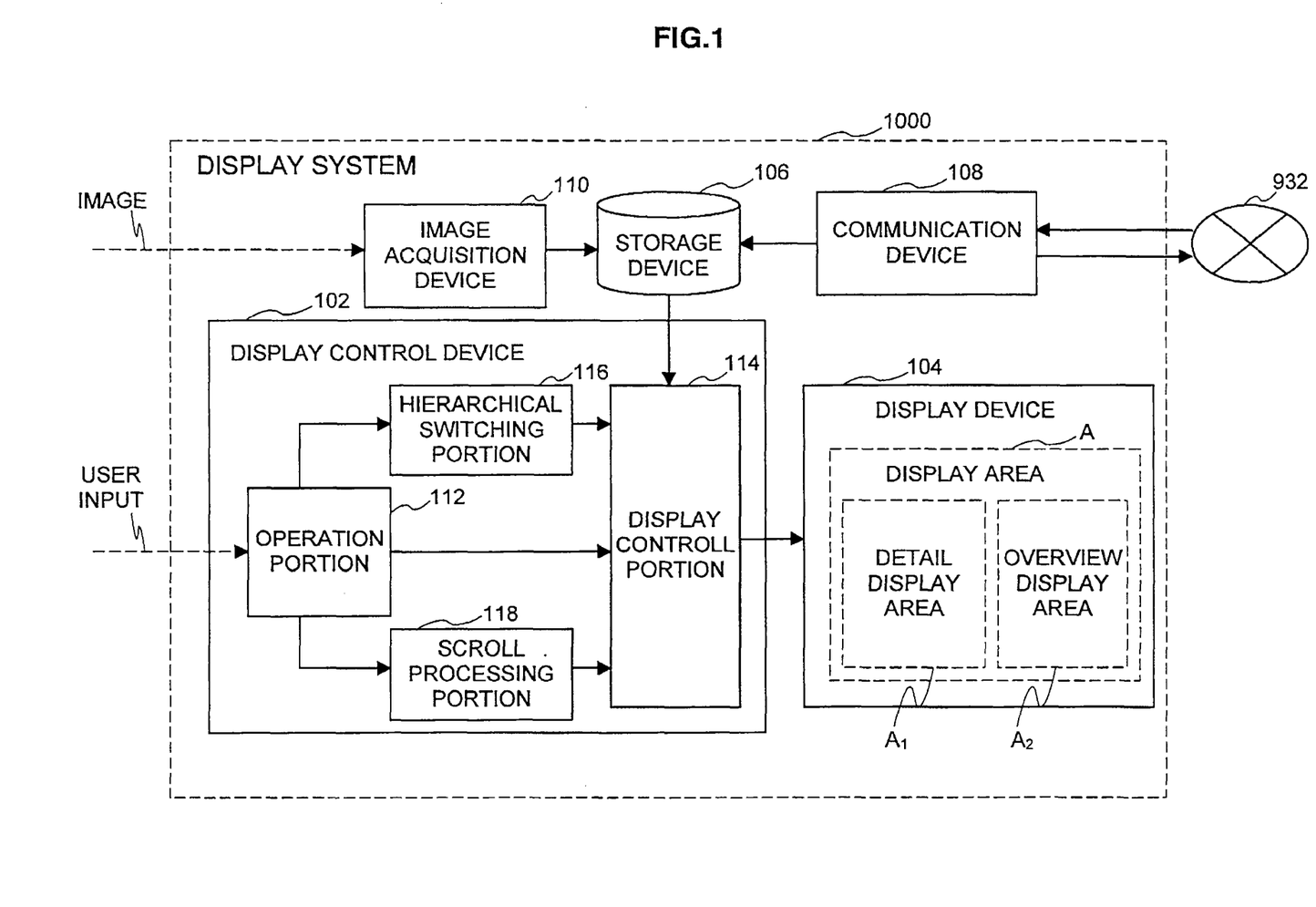
FIG. 1 is an explanatory figure that shows a configuration of a display system according to an embodiment of the present invention.

First, a configuration of a display system 1000 according to the present embodiment will be explained briefly with reference to FIG. 1. FIG. 1 is an explanatory figure that shows the configuration of the display system 1000 according to the present embodiment.

As shown in FIG. 1, the display system 1000 is mainly configured from a display control device 102, a display device 104, a storage device 106, a communication device 108, and an image acquisition device 110.

The display control device 102 performs processing related to display control of a graphical user interface that is displayed on the display device 104. The display device 104 is controlled by the display control device 102 and displays the graphical user interface. A display screen on the display device 104 includes a display area A, in which the graphical user interface is displayed. The display area A includes a detail display area $A_1$ and an overview display area $A_2$. Note that the detail display area $A_1$ and the overview display area $A_2$ may be displayed such that they overlap.

The storage device 106 stores, one of temporarily and permanently, e-mail that is transmitted and received through the communication device 108, still images and moving images (hereinafter called "image data") that are acquired through the image acquisition device 110, and user schedule information, audio data, and Web content, broadcast content, and the like that is acquired through a network 932. The communication device 108 is a communication section that is one of wired and wireless, and it can acquire and provide information through the network 932, which is one of a local area network and a wide area network. The communication device 108 may also be a telephony section, and it may have functions that acquire telephony information such as a calling record, a calling history, and the like and that store the telephony information in the storage device 106. The image acquisition device 110 is an image acquisition section for optically acquiring an image of a subject and storing the image as image data. Note that the image acquisition device 110 may also be a section that acquires audio data as it acquires the image data.

As explained above, the display system 1000 is a system that acquires the content using various types of methods and provides the content it has acquired to a user by displaying the content on the display device 104. For example, it is possible to use one of some and all of the configuring elements of the display system 1000 to configure an information processing terminal such as a mobile device, a mobile telephone, or the like. A functional configuration of the display control device 102 will be explained below in relation to the graphical user interface that is displayed on the display device 104 by the display control device 102. Thereafter, specific examples of configurations of the graphical user interface that is displayed on the display device 104 will be explained.

Functional Configuration of the Display Control Device 102

The functional configuration of the display control device 102 according to the present embodiment will be explained with reference to FIG. 1.

As shown in FIG. 1, the display control device 102 is mainly configured from an operation portion 112, a display control portion 114, a hierarchical switching portion 116, and a scroll processing portion 118.

The operation portion 112 is an operation section for receiving a user input. The display control portion 114 displays the graphical user interface on the display device 104 based on information on the content that is stored in the storage device 106. The display control portion 114 also performs display control processing that moves objects that are displayed in the graphical user interface, switches the display, and the like. The hierarchical switching portion 116, when it receives a level switching command through the operation portion 112, issues a command to the display control portion 114 to switch a level that is displayed in the graphical user interface, which is hierarchically arranged by a specified unit of time. The scroll processing portion 118, when it receives a scroll operation command through the operation portion 112, issues a command to the display control portion 114 to scroll one of an object and a display area in the graphical user interface.

The functional configuration of the display control device 102 according to the present embodiment has been explained briefly. The functions of the individual configuring elements described above are used to perform the display control processing for the graphical user interface according to the present embodiment.

Examples of Configurations of the Graphical User Interface

Figure 2:
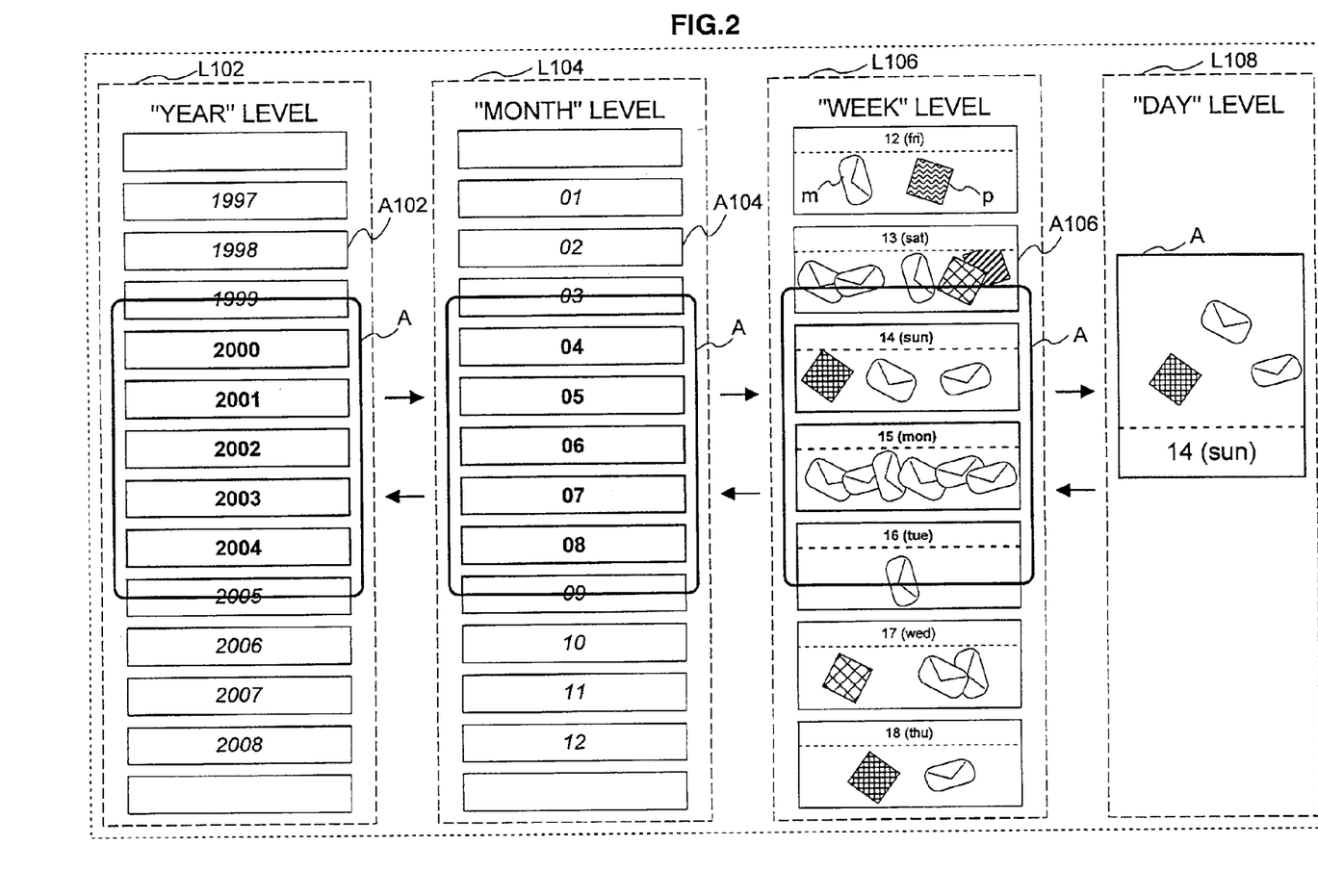
FIG. 2 is an explanatory figure that shows a configuration of a graphical user interface according to the embodiment.
Figure 3:
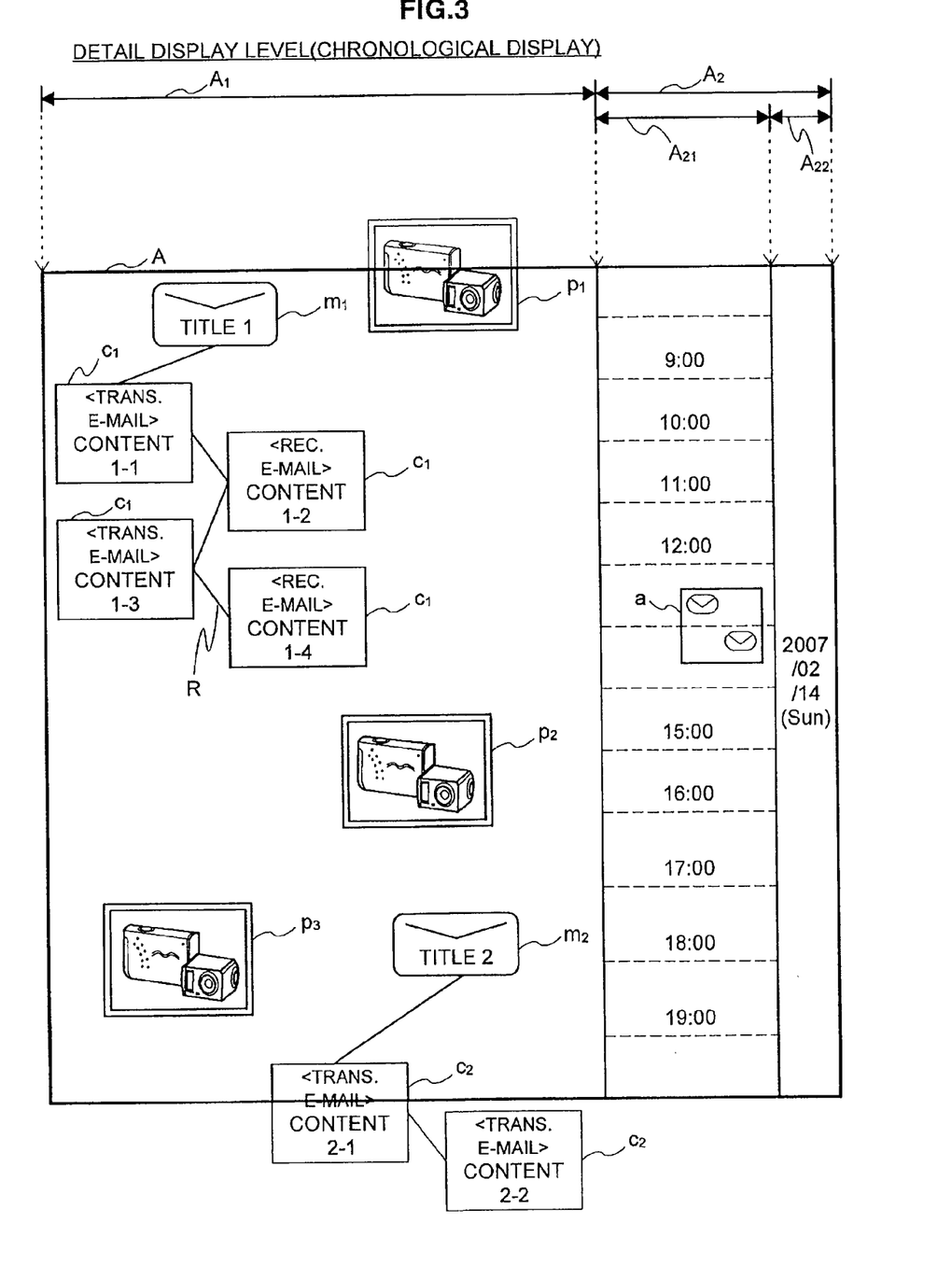
FIG. 3 is an explanatory figure that shows a configuration of the graphical user interface according to the embodiment.
Figure 4:
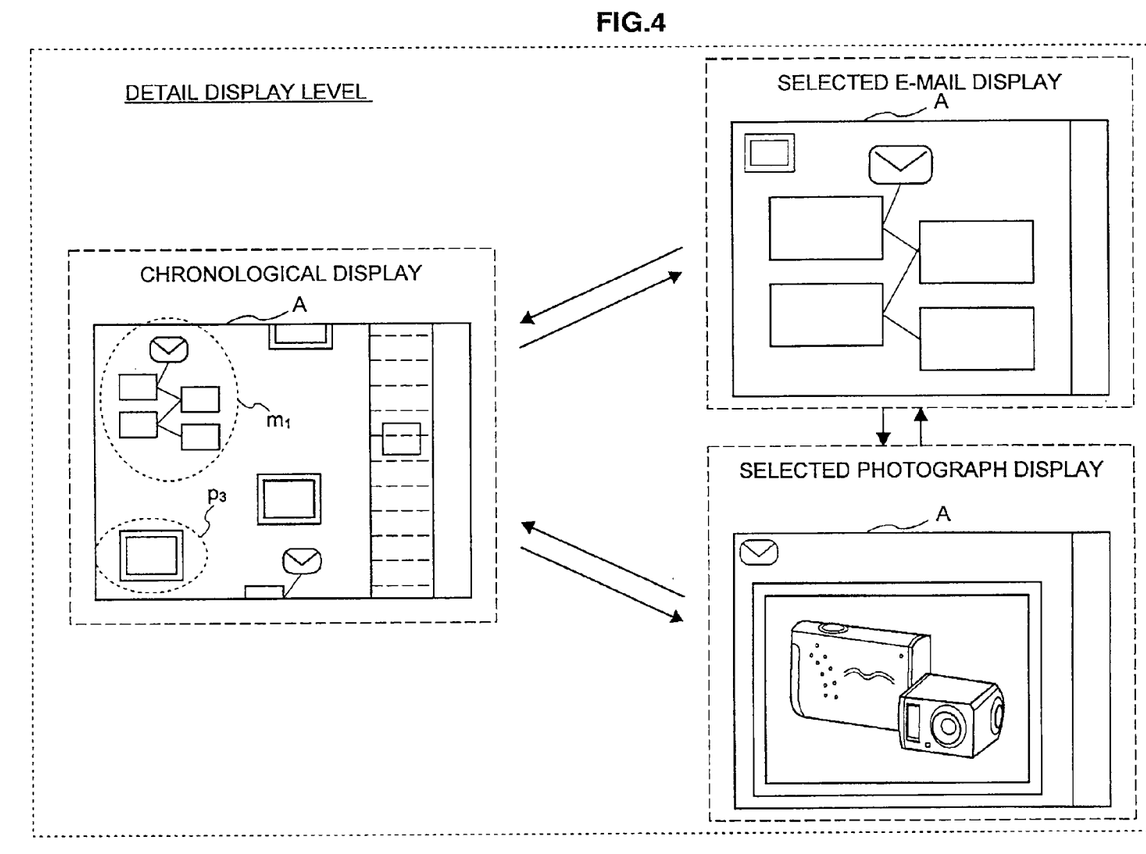
FIG. 4 is an explanatory figure that shows a configuration of the graphical user interface according to the embodiment.

The configurations of the graphical user interface according to the present embodiment will be explained with reference to FIGS. 2 to 4. FIGS. 2 to 4 are explanatory figures that show examples the configurations of the graphical user interface according to the present embodiment.

Flow of Basic Operation

First, a flow of an operation that uses the graphical user interface according to the present embodiment will be explained briefly with reference to FIG. 2.

The graphical user interface according to the present embodiment has a hierarchical structure with separate levels for specified time units. For example, the hierarchical structure according to the present embodiment, as shown in FIG. 2, includes a year level L102, a month level L104, a week level L106, and a day level L108.

For example, the user may start up the display system 1000 and display the year level L102. At the year level L102, a plurality of yearly display objects A102 are displayed in chronological order within the display area A. The yearly display objects A102 display time information by the year. The display control portion 114 may prepare more of the yearly display objects A102 than can be displayed within the display area A and may display the prepared yearly display objects A102 when the display area A is scrolled.

The user can also switch the display level to the month level L104 through the hierarchical switching portion 116. At the month level L104, a plurality of monthly display objects A104 are displayed in chronological order within the display area A. The monthly display objects A104 display time information by the month. In the same manner as at the year level L102, the display control portion 114 may prepare more of the monthly display objects A104 than can be displayed within the display area A and may display the prepared monthly display objects A104 when the display area A is scrolled.

The user can also switch the display level to the week level L106 through the hierarchical switching portion 116. At the week level L106, a plurality of daily display objects A106 are displayed in chronological order within the display area A. The daily display objects A106 display time information by the day and also display information on the content that was acquired and provided on the days that correspond to the daily display objects A106. For example, the daily display objects A106 may include e-mail objects m that indicate the presence of e-mails and photograph objects p that indicate the presence of photographs, with the e-mail objects m and the photograph objects p being correlated to the time information. This makes it possible for the user to understand at a glance what content, such as e-mails, photographs, and the like, were acquired and provided on the days for which the daily display objects A106 are displayed.

The user can also switch the display level to the day level L108 through the hierarchical switching portion 116. At the day level L108, one of the daily display objects A106 that was selected at the week level L106 is displayed in enlarged form. This makes it possible for the user to understand more accurately the numbers of the e-mail objects m and the photograph objects p that are displayed in the selected daily display object A106. Note that the user can switch freely among the year level L102, the month level L104, the week level L106, and the day level L108.

Display Configurations of Detail Display Level

The graphical user interface according to the present embodiment also includes a detail display level. This makes it possible for the user to switch to the detail display level for the daily display object A106 that is selected at one of the week level L106 and the day level L108, for example. Display configurations of the detail display level will be explained with reference to FIG. 3.

As shown in FIG. 3, the detail display level is mainly configured from the detail display area $A_1$ and the overview display area $A_2$.

The detail display area $A_1$

First, a display configuration for the detail display area $A_1$ will be explained.

As shown in FIG. 3, objects that correspond to a plurality of types of content are displayed in the detail display area $A_1$. For example, e-mail title objects $m_1$, $m_2$, e-mail content objects $c_1$, $c_2$, photograph objects $p_1$, $p_2$, $p_3$, and the like may be displayed in the detail display area $A_1$. Header information, such as titles, subjects, and the like of transmitted and received e-mails, are displayed in the e-mail title objects $m_1$, $m_2$. The header information may also include, for example, a name or the like of a sender and a recipient. The e-mail content objects $c_1$, $c_2$ are also linked to the corresponding e-mail title objects $m_1$, $m_2$. A relationship between linked objects is displayed by a link display object R.

For example, a plurality of transmitted e-mails $(c_1)$ and received e-mails $(c_1)$ that are related to a title 1 of the e-mail title object $m_1$ are linked to the e-mail title object $m_1$. Each of the objects may be linked and displayed based on the time information for the content. For example, the time information may include a transmission date and time for a transmitted e-mail and a receiving date and time for a received e-mail.

Further, one of all and a part of the content of a transmitted e-mail and a received e-mail is displayed in the e-mail content objects $c_1$, $c_2$. One of photographs that were actually taken and thumbnails of the photographs are displayed in the photograph objects $p_1$, $p_2$, $p_3$. Meta-information that is appended to the photographs may also be displayed as the photograph objects $p_1$, $p_2$, $p_3$.

Each of the objects described above is disposed within the display area A based on the time information for the corresponding content. For example, each of the objects is displayed such that the time that is displayed at the corresponding position in a timeline display area $A_{21}$ matches the time information for the corresponding content. This makes it possible for the user to recognize that a plurality of types of content that are displayed in positions that correspond to almost the same time were one of acquired and provided at the same time. A practical use for this might be in implementing a method by which the user can understand an event that is related to a scene in an acquired photograph by reading the text of an e-mail that was transmitted or received at the same time. The display control portion 114 may also buffer an object that is positioned before or after the currently displayed display area A and that is for a time area outside the display area A.

The Overview Display Area $A_2$

Next, a display configuration for the overview display area $A_2$ will be explained. The overview display area $A_2$ is mainly configured from the timeline display area $A_{21}$ and a time information display area $A_{22}$. The time information display area $A_{22}$ is a display area where the time information is displayed by the day.

On the one hand, as shown in FIG. 3, the time information, divided into specified time units, is displayed in the timeline display area $A_{21}$. Note that the time information that is displayed in the timeline display area $A_{21}$ may also be displayed in any preferred time units that make it easy for the user to view. An area display object a is displayed in the timeline display area $A_{21}$. The area display object a indicates an area that is displayed in the detail display area $A_1$. Therefore, information on the acquired and provided content is displayed in the detail display area $A_1$, within the time area in which the area display object a is displayed. The processing is mainly performed by the display control portion 114, and the information that is displayed in the detail display area $A_1$ is determined based on the time information for the content.

The area display object a can also move freely within the timeline display area $A_{21}$. This makes it possible for the user to use the operation portion 112 to move the area display object a and to scroll through the information that is displayed in the detail display area $A_1$. The information on the content that is contained in the area indicated by the area display object a may also be displayed in the area display object a. For example, in a case where the area display object a is positioned in a certain time area, and a transmitted or received e-mail is present within that time area, an object such as an icon or the like that indicates the e-mail may also be displayed within the area display object a. This configuration makes it easy for the user to search for the acquired and provided content within a certain time range while moving the area display object a within the timeline display area $A_{21}$. Note that the object that indicates the presence of the content may also be displayed within the timeline display area $A_{21}$ outside the area display object a.

As described above, at the detail display level, a plurality of types of content are displayed in the detail display area $A_1$ in conjunction with the time information that is specified in the timeline display area $A_{21}$. Further, the display in the detail display area $A_1$ can be scrolled in any direction in accordance with the user's movement of the area display object a that is displayed in the timeline display area $A_{21}$. Moreover, based on key information that is contained in the content, a plurality of objects are displayed as linked, each of the objects corresponding to one of the plurality of the content items. The objects are disposed within the detail display area $A_1$ based on the time information in the timeline display area $A_{21}$, so by treating the time information as the key information, the user can recall how the various types of content are related. By scrolling the display in the direction of the passage of time, the user can review memories based on the e-mails and the photographs that were created at the same time. In other words, the detail display level creates a kind of journal of memories.

Switching at the Detail Display Level

Next, switching of the display at the detail display level will be explained with reference to FIG. 4.

The detail display level of the graphical user interface according to the present embodiment can be switched from the chronological display configuration shown in FIG. 3 to a display configuration that is suited to the individual content item. For example, as shown in FIG. 4, it is possible to switch from the chronological display to a selected e-mail display and to switch from the chronological display to a selected photograph display. Of course, it is also possible to switch from the selected e-mail display to the selected photograph display.

For example, in a case where the user switches from the chronological display to the selected e-mail display, the user selects an e-mail object that is displayed in chronological order in the detail display area $A_1$ (the e-mail title object $m_1$, for example) and uses the operation portion 112 to perform the display switching operation. When the user performs the display switching operation, the display control portion 114 switches the graphical user interface from the chronological display to the selected e-mail display. In the same manner, when the user selects a photograph object that is displayed in chronological order in the detail display area $A_1$ (the photograph object $p_1$, for example) and uses the operation portion 112 to perform the display switching operation, the display control portion 114 switches the graphical user interface from the chronological display to the selected photograph display.

For example, an e-mail title object and an e-mail content object for the selected e-mail may be displayed in the selected e-mail display. Note that detailed content for the e-mail may also be displayed. On the other hand, in the selected photograph display, the selected photograph may be displayed in one of a full-screen display and a size that is appropriate to the size of the photograph. Other types of content may also be displayed in sizes and by methods of expression that are suited to the display format of the content.

As explained above, the detail display level according to the present embodiment can be freely switched to a display method that is suited to the display format of the content that is displayed. Further, a button that is used for switching the display may also be displayed within the graphical user interface, although the button is not shown in the drawings. In a case where the button is displayed, the user can switch the display method by using the operation portion 112, which may be configured from a touch panel, a touch pen, or the like, to press the button.

The display configurations of the graphical user interface according to the present embodiment have been explained. The user can use the graphical user interface described above to display in chronological order on a single screen data that has been created by a plurality of different applications. This makes it easy for the user to understand events of a certain day by referring to the juxtaposed data.

For example, the graphical user interface described above can correlate data for the e-mails that were transmitted and received on a certain day with data for the photographs that were taken on that day and display the data along a timeline. As the user scrolls through the timeline, the graphical user interface scrollably displays in the detail display area $A_1$ the data that corresponds to specific times. Thus the data that has been created by different applications is lined up in chronological order, so that by scrolling through the display area, the user can view the data in the order that the user experienced it. Based on the content of an e-mail, the user can also understand the circumstances under which a photograph was acquired and the like without performing any editing tasks such as affixing a title to the photograph, managing files, and the like. This makes file management easier.

Furthermore, with respect to the content that is produced through exchanges with another party, such as e-mails and the like, the objects that indicate the content can be displayed in a linked manner such that the exchanges can be understood. This makes it possible for the user to view the e-mails in an order that follows the flow of conversations and exchanges with the other party.

To summarize briefly, the user can view a plurality of types of chronologically arranged data by scrolling through the display, so by viewing acquired photographs while viewing the contents of e-mails, the user can understand the events depicted in the photographs based on the texts of the e-mails. This makes it possible for the user to use the time information that is appended to the photographs to understand the circumstances under which the photographs were acquired, based on the texts of the e-mails, without performing any editing tasks such as appending comments to the individual photographs and the like. In other words, because the user can use the e-mails as a log of the user's exchanges and thus can view the data in the order in which the user experienced it, the user can also use the e-mails as tags that are useful for other data. Of course, not only the e-mails and the photographs, but also audio data, memo data, and schedule data can be coordinated in this manner. For example, viewing records for moving image data, Web pages, and the like can also be handled in the same manner as the content described above.

Hardware Configuration

Figure 5:
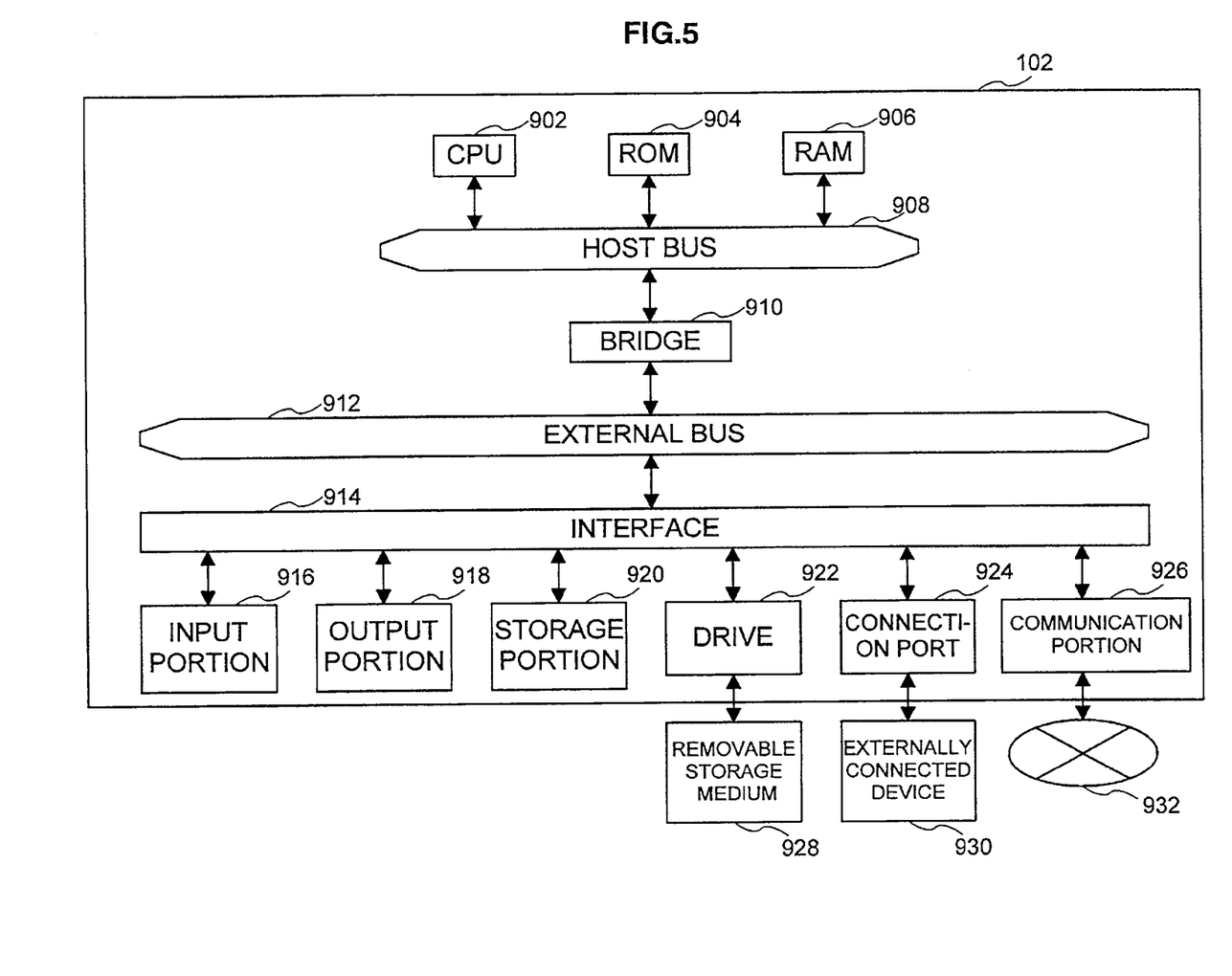
FIG. 5 is an explanatory figure that shows a hardware configuration of a display control device according to the embodiment.

The functions of the various configuring elements of the display control device 102 described above can be implemented in an information processing device that has a hardware configuration like that shown in FIG. 5. FIG. 5 is an explanatory figure that shows a hardware configuration of an information processing device that can implement the functions of the various configuring elements of the display control device 102.

As shown in FIG. 5, the information processing device mainly includes a central processing unit (CPU) 902, a read only memory (ROM) 904, a random access memory (RAM) 906, a host bus 908, a bridge 910, an external bus 912, an interface 914, an input portion 916, an output portion 918, a storage portion 920, a drive 922, a connection port 924, and a communication portion 926.

The CPU 902 functions as at least one of a computation processing device and a control device, for example, and controls one of all or a part of the operations of the various configuring elements, based on various types of programs that are stored in at least one of the ROM 904, the RAM 906, the storage portion 920, and a removable storage medium 928. The ROM 904 stores data and the like that are used by computations and by programs that are read by the CPU 902, for example. The RAM 906 stores, at least one of temporarily and permanently, the programs that are read by the CPU 902, as well as various types of parameters and the like that vary as necessary when the programs are executed, for example. These configuring elements are interconnected by the host bus 908, for example, which is capable of high speed data transmission. The host bus 908 is connected through the bridge 910 to the external bus 912, whose data transmission speed is comparatively low.

The input portion 916 is an operation portion such as a mouse, a keyboard, a touch panel, a button, a switch, a lever, or the like, for example. The input portion 916 may also be a remote control portion (what is called a remote control) that is capable of transmitting a control signal using infrared light or another electromagnetic wave. The input portion 916 also includes an input control circuit for transmitting to the CPU 902, as an input signal, information that is input using the operation portion described above.

The output portion 918 is a device that is capable of at least one of visibly and audibly notifying a user of information that has been obtained. The output portion 918 may be, for example, a display device, such as a cathode ray tube (CRT), a liquid crystal display (LCD), a plasma display panel (PDP), an electro-luminescence display (ELD), or the like, an audio output device such as a speaker, a headphone, or the like, a printer, a mobile telephone, a facsimile machine, or the like.

The storage portion 920 is a device for storing various types of data. The storage portion 920 may be configured from a magnetic storage device such as a hard disk drive (HDD) or the like, a semiconductor storage device, an optical storage device, a magneto optical storage device, or the like, for example.

The drive 922 is a device that at least one of reads information from and writes information to the removable storage medium 928, which is a magnetic disk, an optical disk, a magneto optical disk, a semiconductor memory, or the like, for example. The removable storage medium 928 may be a DVD medium, a Blu-ray medium, an HD DVD medium, a Compact Flash (CF) card, a memory stick, a Secure Digital (SD) memory card, or the like, for example. Of course, the removable storage medium 928 may also be an electronic device, an integrated circuit (IC) card that carries a non-contact IC chip, or the like.

The connection port 924 is a port such as a Universal Serial Bus (USB) port, an IEEE 1394 port, a Small Computer System Interface (SCSI) port, an RS-232C port, or the like for connecting to an externally connected device 930. The externally connected device 930 may be a printer, a portable music player, a digital camera, a digital video camera, an IC recorder, or the like, for example.

The communication portion 926 is a communication device for connecting to a network 932 and may be, for example, a communication card for a wired or wireless local area network (LAN), for Bluetooth®, or for Wireless USB, a router for optical communication, a router for an Asymmetric Digital Subscriber Line (ADSL), a modem for various types of communication, or the like. The network 932 to which the communication portion 926 is connected is a network that is connected by wire or wirelessly and may be, for example, the Internet, a home LAN, an infrared communication network, a broadcast network, a satellite communication network, or the like.

It should be understood by those skilled in the art that various modifications, combinations, sub-combinations and alterations may occur depending on design requirements and other factors insofar as they are within the scope of the appended claims or the equivalents thereof.

For example, the graphical user interface according to the embodiment described above may also include the functions described below. For example, the graphical user interface may include a function such that in a case where an e-mail is selected at the day level L108, all of the transmitted and received e-mails with the same subject are displayed at the detail display level in chronological order, along with their attached files, making it possible for the user to read the e-mails in the order in which the exchange proceeded. The transmitted e-mails and the received e-mails may also be displayed in a clearly distinguished manner, making it easy for the user to understand the exchange of messages visually. Further, at the detail display level, the unselected e-mails and photographs for the same day as the e-mails and photographs that were selected may also be displayed along the right edge of the screen. This configuration makes it possible to switch the display quickly to the other e-mails and photographs.

The graphical user interface described above may also be provided with a display switching button at the detail display level. By selecting the button while a specific e-mail or photograph is selected on the detail display screen, the user may cause all of the data for date of the selected e-mail or photograph to be displayed in chronological order. Note that the display control device 102 described above may also include a focused search function. For example, the display control device 102 can be configured such that if the user selects specific key information that is displayed in the graphical user interface, the objects for the content that is related to the key information are highlighted in the display. The display control device 102 may also be configured such that the e-mails and photographs that are related to registered schedule information or the like are highlighted in the display.

What is claimed is:

1. A non-transitory computer readable storage medium encoded with computer program instructions, which, when executed, cause the computer to execute a method of generating a graphical user interface that displays information on a plurality of different types of content on a single screen, the method comprising:

generating an overview display area that displays overview information of the plurality of different types of content in chronological order, based on time information for the plurality of the different types of content, the different types of content including incoming and outgoing messages and acquired photographs; and generating a detail display area that displays detail information of the content that corresponds to a time period that is selected in the overview display area, wherein scrolling the overview information that is displayed in the overview display area causes the detail information displayed in the detail display area to be scrolled.

2. The non-transitory computer readable storage medium according to claim 1, wherein the detail information of the content is displayed as linked in the detail display area, based on key information that is contained in the content.

3. The non-transitory computer readable storage medium according to claim 1, wherein one of all and a part of the detail information of the content that corresponds to the time period that is selected in the overview display area is displayed in the detail display area.

4. The non-transitory computer readable storage medium according to claim 1, wherein information on e-mail data and information on image data that are mutually related based on the time information, are displayed in the detail display area.

5. The non-transitory computer readable storage medium according to claim 1, wherein the overview information includes icons representing each of the plurality of different types of content displayed in the overview display area.

6. The non-transitory computer readable storage medium according to claim 1, wherein detail information of message content displayed in the detail display area includes thread information.

7. The non-transitory computer readable storage medium according to claim 1, wherein detail information of photograph content displayed in the detail display area includes a thumbnail of the photograph content.

8. A display control device, comprising:

a processing unit including a display control portion that displays on a display device a graphical user interface that includes an overview display area and a detail display area, the overview display area displaying, based on time information for a plurality of different types of content, overview information of the plurality of different types of content in chronological order, the different types of content including incoming and outgoing messages and acquired photographs, and the detail display area displaying detail information of the content that corresponds to a time period that is selected in the overview display area; and a scroll processing portion that, in a case where the overview information that is displayed in the overview display area is scrolled, scrollably displays, in accordance with the scrolling in the overview display area, the detail information displayed in the detail display area.

9. A display method performed using a device including a processing unit, comprising the steps of:

displaying on a display device a graphical user interface that includes an overview display area and a detail display area, the overview display area displaying, based on time information for a plurality of different types of content, overview information of the plurality of different types of content in chronological order, the different types of content including incoming and outgoing messages and acquired photographs, and the detail display area displaying detail information of the content that corresponds to a time period that is selected in the overview display area; and performing control using the processing unit such that, in a case where the overview information that is displayed in the overview display area is scrolled, the detail information displayed in the detail display area is scrolled in accordance with the scrolling in the overview display area.

10. A non-transitory computer readable storage medium storing computer readable instructions that, when executed by a computer, cause the computer to perform a display method, the method comprising:

displaying on a display device a graphical user interface that includes an overview display area and a detail display area, the overview display area displaying, based on time information for a plurality of different types of content, overview information of the plurality of different types of content in chronological order, the different types of content including incoming and outgoing messages and acquired photographs, and the detail display area displaying detail information of the content that corresponds to a time period that is selected in the overview display area; and performing control such that, in a case where the overview information that is displayed in the overview display area is scrolled, scrollably displays, in accordance with the scrolling in the overview display area, the detail information displayed in the detail display area.

* * * * *